United States Patent
Salisbury et al.

(10) Patent No.: US 6,330,573 B1
(45) Date of Patent: Dec. 11, 2001

(54) MAINTAINING DOCUMENT IDENTITY ACROSS HIERARCHY AND NON-HIERARCHY FILE SYSTEMS

(75) Inventors: Michael P. Salisbury, Mountain View; James P. Dourish; Warren K. Edwards, both of San Francisco; Anthony G. LaMarca, Redwood City, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/143,772

(22) Filed: Aug. 31, 1998

(51) Int. Cl.$^7$ .................................................. G06F 15/00
(52) U.S. Cl. ............................................. 707/511; 707/203
(58) Field of Search ................................... 707/201, 514, 707/513, 200, 511, 516, 203; 345/356; 704/213

(56) References Cited

U.S. PATENT DOCUMENTS

| | | | |
|---|---|---|---|
| 4,959,769 | * 9/1990 | Cooper et al. | 707/533 X |
| 5,089,956 | * 2/1992 | MacPhail | 707/1 |
| 5,132,900 | * 7/1992 | Gilchrist et al. | 707/9 |
| 5,455,945 | * 10/1995 | Vanderdrift | 707/2 |
| 5,649,192 | * 7/1997 | Stucky | 707/103 |
| 5,727,195 | * 3/1998 | Nakatsuyama | 707/1 |
| 5,754,782 | * 5/1998 | Masada | 709/213 |
| 5,805,889 | * 9/1998 | Van De Vanter | 717/3 |
| 5,812,995 | * 9/1998 | Sasaki et al. | 707/1 |
| 5,845,067 | * 12/1998 | Porter et al. | 713/200 |
| 5,893,908 | * 4/1999 | Cullen et al. | 707/5 |
| 5,940,830 | * 8/1999 | Ochitani | 707/10 |
| 6,003,040 | * 12/1999 | Mital et al. | 707/103 |
| 6,009,442 | * 12/1999 | Chen et al. | 707/522 |
| 6,012,074 | * 1/2000 | Lucas et al. | 707/531 |
| 6,049,799 | * 4/2000 | Mangat et al. | 707/10 |

OTHER PUBLICATIONS

Interposition agents: Transparently Interposing User Code at the System Interface, Michael B. Jones, (Microsoft Research, Microsoft Corp.) Proceedings of the 14th ACM Symposium on Operating System Principles, pp. 80–90; 1993.

Lifestreams: Organizing Your Electronic Life, Freeman et al., (Yale University, Dept of Computer Science) Proceedings of the CHI 96 Conference Companion on Human Factors in Computing Systems, pp. 410–411; 1996.

The Digital Library Integrated Task Enironment (DLITE), Cousins et al., (Stanford University/ Xerox PARC) Jul. 1997.

Semantic File Systems, Gifford et al., (Programming Systems Research Group, 1991 ACM 0–89791–447–3/91/0009/0016).

SLIC: An Extensibility System for Commodity Operating Systems, Ghormley et al., (Computer Science Division, Univ. of CA at Berkley) Feb. 11, 1998.

Finfing And Reminding: File Organization From The Desktop, Barreau et al., (SIGCHI, vol. 27, No. 3, Jul. 1995).

(List continued on next page.)

Primary Examiner—Joseph H. Feild
(74) Attorney, Agent, or Firm—Fay, Sharpe, Fagan, Minnich & McKee, LLP

(57) ABSTRACT

A mechanism and method for translating between two incompatible document management systems whereby the identity of a document is maintained. The mechanism and method allows for the maintaining of information related to an original document to reconstruct the original document which was deleted. The maintained information including name information, location information and characteristic information. The characteristic information being properties which are attached to a document in a document management system which separates the content from properties of the document.

9 Claims, 5 Drawing Sheets

OTHER PUBLICATIONS

Finding and Reminding, Reconsidered, Ferting et al., (SIGCHI, vol. 28, No. 1, Jan. 1996).

Information Visualization Using 3D Interactive Animation, Robertson et al., (Communications of the ACM, vol. 36, No. 4, Apr. 1993).

Using a Landscape Metaphor to Represent a Corpus of Documents, Matthew Chalmers, (Rank Xerox EuroParc, in Proc. European Conf. on Spatial Information Theory, Elba, Sep. 1993).

A Pile Metaphor For Supporting Casual Organization of Information, Mander et al., (Chi '92, 1992 ACM 0–08791–513–5/92/0005–0627).

Representing Information about Files, Jeffrey Mogul, (Computer Science Dept., Stanford, University, CH2021–4/84/ 0000/0432$01.00 1984 IEEE).

* cited by examiner

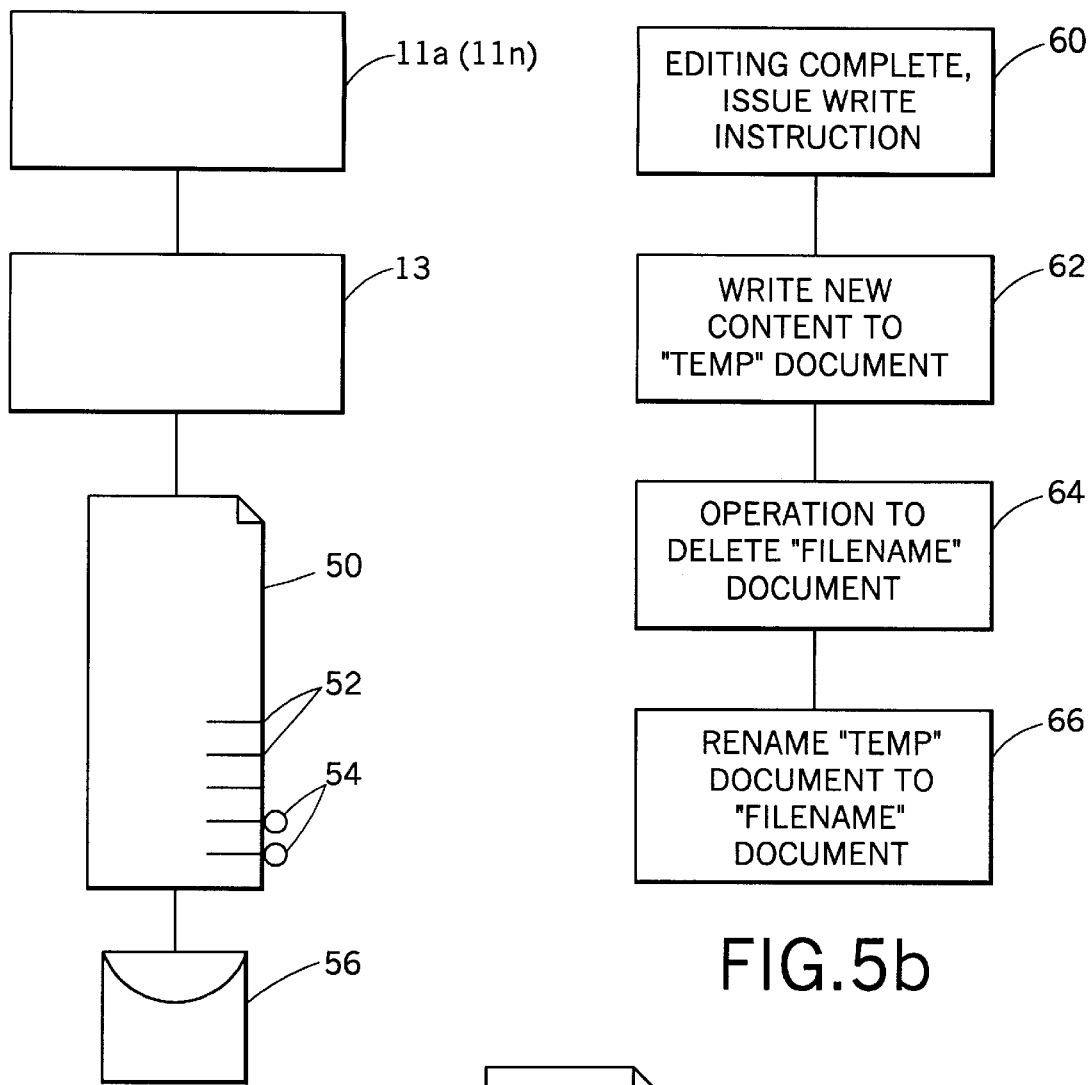
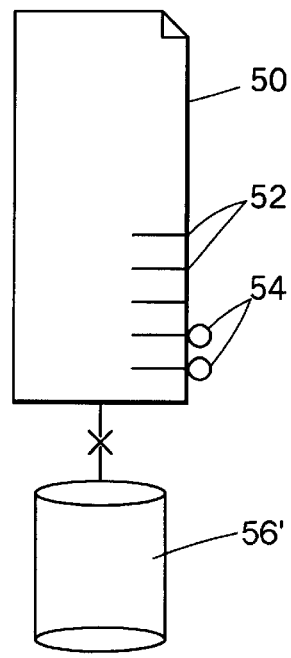
FIG.5a  FIG.5b  FIG.5c

MAINTAINING DOCUMENT IDENTITY ACROSS HIERARCHY AND NON-HIERARCHY FILE SYSTEMS

The following applications are related to the present application: U.S. Ser. No. 09/143,802, pending, Anthony G. LaMarca, et al., entitled USER LEVEL ACCESSING OF LOW-LEVEL COMPUTER SYSTEM OPERATIONS; U.S. Ser. No. 09/143,551, pending, Karin Petersen, et al., entitled PROPERTY-BASED USER LEVEL DOCUMENT MANAGEMENT; U.S. Ser. No. 09/143,778, pending, Douglas B. Terry, et al., entitled A PROPERTY-BASED MECHANISM FOR FLEXIBLY SUPPORTING FRONT-END AND BACK-END COMPONENTS HAVING DIFFERENT COMMUNICATION PROTOCOLS; U.S. Ser. No. 09/144,143, pending, Warren K. Edwards, et al., entitled ATOMIC AND MOLECULAR DOCUMENTS; U.S. Ser. No. 09/143,555, pending, Michael P. Salisbury, et al, entitled VIRTUAL DOCUMENTS; U.S. Ser. No. 09/144,383, pending, John O. Lamping, et al, entitled SELF CONTAINED DOCUMENT MANAGEMENT BASED ON DOCUMENT PROPERTIES; U.S. Ser. No. 09/143,773, U.S. Pat. No. 6,240,429, James D. Thornton, et al., entitled SERVICE INTERACTION USING PROPERTIES ATTACHED TO DOCUMENTS; U.S. Ser. No. 09/144,231, U.S. Pat. No. 6,253,217, James P. Dourish, et al., entitled ACTIVE PROPERTIES FOR DYNAMIC SYSTEM CONFIGURATION; U.S. Ser. No. 09/143,777, pending, Warren K. Edwards, et al., entitled EXTENDING APPLICATION BEHAVIOR THROUGH DOCUMENT PROPERTIES; U.S. Ser. No. 09/144,032, pending, Anthony G. LaMarca, et al, entitled CLUSTERING RELATED FILES IN A DOCUMENT MANAGEMENT SYSTEM.

Each of the above applications filed Aug. 31, 1998 and assigned to a common assignee are hereby incorporated by reference.

BACKGROUND OF THE INVENTION

The present invention is directed to a mechanism directed to maintaining a document identity during translation of operations from a first system to a second system, and more particularly from an instruction within a hierarchical file system which treats a document as a single repository of unified data to a document management system which adds additional information to a document to enhance interactions with documents being managed.

The inventors have recognized that a large amount of a user's interaction with a computer has to do with document management, such as storing, filing, organizing and retrieving information from numerous electronic documents. These documents may be found on a local disc, on a network system file server, an e-mail file server, the world wide web, or a variety of other locations. Modern communication delivery systems have had the effect of greatly increasing the flow of documents which may be incorporated within a user's document space, thereby increasing the need for better tools to visualize and interact with the accumulated documents.

The most common tools for organizing a document space rely on a single fundamental mechanism known as hierarchical storage systems, wherein documents are treated as files that exist in directories or folders, which are themselves contained in other directories, thereby creating a hierarchy that provides the structure for document space interactions. Each directory in a hierarchy of directories, will commonly contain a number of individual files. Typically, files and directories are given alpha-numeric, mnemonic names in large storage volumes shared via a network. In such a network, individual users may be assigned specific directories.

A file located in a sub-directory is located by its compound path name. For example, character string D:\TREE\LIMB\BRANCH\TWIG\LEAF.FIL could describe the location of a file LEAF.FIL whose immediate directory is TWIG and which is located deep in a hierarchy of files on the drive identified by the letter D. Each directory is itself a file containing file name, size, location data, and date and time of file creation or changes.

Navigation through a file system, to a large degree, can be considered as navigation through semantic structures that have been mapped onto the file hierarchy. Such navigation is normally accomplished by the use of browsers and dialog boxes. Thus, when a user traverses through the file system to obtain a file (LEAF.FIL), this movement can be seen not only as a movement from one file or folder to another, but also as a search procedure that exploits features of the documents to progressively focus on a smaller and smaller set of potential documents. The structure of the search is mapped onto the hierarchy provided by the file system, since the hierarchy is essentially the only existing mechanism available to organize files. However, documents and files are not the same thing.

Since files are grouped by directories, associating a single document with several different content groupings is cumbersome. The directory hierarchy is also used to control the access to documents, with access controls placed at every node of the hierarchy, which makes it difficult to grant file access to only one or a few people. In the present invention, separation of a document's inherent identity from its properties, including its membership in various document collections, alleviates these problems.

Other drawbacks include that existing hierarchical file systems provide a "single inheritance" structure. Specifically, files can only be in one place at a time, and so can occupy only one spot in the semantic structure. The use of links and aliases are attempts to improve upon such a limitation.

Thus, while a user's conception of a structure by which files should be organized may change over time, the hierarchy described above is fixed and rigid. While moving individual files within such a structure is a fairly straightforward task, reorganizing large sets of files is much more complicated, inefficient and time consuming. From the foregoing it can be seen that existing systems do not address a user's need to alter a file structure based on categories which change over time. At one moment a user may wish to organize the document space in terms of projects, while at some time in the future the user may wish to generate an organization according to time and/or according to document content. A strict hierarchical structure does not allow management of documents for multiple views in a seamless manner resulting in a decrease in the efficiency of document retrieval.

Existing file systems also support only a single model for storage and retrieval of documents. This means a document is retrieved in accordance with a structure or concepts given to it by its author. On the other hand, a user —who is not the author—may wish to retrieve a document in accordance with a concept or grouping different from how the document was stored.

Further, since document management takes place on a device having computational power, there would be benefits to harnessing the computational power to assist in the organization of the documents. For example, by attaching a spell-checker property to a document, it can extend the read operation of a document so that the content returned to the requesting application will be correctly spelled.

The inventors are aware that others have studied the area of document management/storage systems.

DMA is a proposed standard from AIIM designed to allow document management systems from different vendors to interoperate. The DMA standard covers both client and server interfaces and supports useful functionality including collections, versioning, renditions, and multiple-repository search. A look at the APIs show that DMA objects (documents) can have properties attached to them. The properties are strongly typed in DMA and must be chosen from a limited set (string, int, date . . . ). To allow for rich kinds of properties, one of the allowable property types is another DMA object. A list type is allowed to build up big properties. Properties have a unique IDs in DMA. Among the differences which exist to the present invention, is the properties are attached to documents without differentiation about which user would like to see them; properties are stored in the document repository that provides the DMA interface, not independently from it. Similarly, DMA does not provide support for active properties.

WebDAV is another interface designed to allow an extended uniform set of functionality to be attached with documents available through a web server. WebDAV is a set of extensions to the HTTP 1.1 protocol that allow Web clients to create and edit documents over the Web. It also defines collections and a mechanism for associating arbitrary properties with resources. WebDAV also provides a means for creating typed links between any two documents, regardless of media type where previously, only HTML documents could contain links. Compared to the present invention, although WebDAV provides support for collections, these are defined by extension (that is all components have to be explicitly defined); and although it provides arbitrary document properties, these live with the document itself and cannot be independently defined for different users, furthermore there is no support for active properties and are mostly geared toward having ASCII (or XML) values.

DocuShare is a simple document management system built as a web-server by Xerox Corporation. It supports simple collections of documents, limited sets of properties on documents and support for a few non-traditional document types like calendars and bulletin boards. It is primarily geared toward sharing of documents of small, self-defined groups (for the latter, it has support to dynamically create users and their permissions.) DocuShare has notions of content providers, but these are not exchangeable for a document. Content providers are associated with the type of the document being accessed. In DocuShare properties are static, and the list of properties that can be associated with a document depends on the document type. Users cannot easily extend this list. System administrators must configure the site to extend the list of default properties associated with document types, which is another contrast to the present invention. Also, in DocuShare properties can be visible to anyone who has read access for the collection in which the document is in. Properties are tightly bound to documents and it is generally difficult to maintain a personalized set of properties for a document, again a different approach than the one described in the present invention.

File systems which attempt to add additional pieces of information with regard to a file, include the NT 5 file system, the Be file system and a system known as Burlap. These systems attempt to offer capabilities for interacting with document spaces. However, they do require that applications be aware of these new capabilities in order to take advantage of them.

An operating system "SPIN" from the University of Washington allows users to inject code into the kernel that is invoked when an appropriate system call or system state occurs. (For example, users can inject code that alters paging decisions.) Their technology could be used to make it possible to inject code into the file system to invoke a user's code on read and write. Among the differences between SPIN and the concepts of present invention are that code injected into SPIN runs at the kernel level and users can only express their behaviors in a restricted, safe language in which it is not possible to do "bad things." As such, expressiveness is limited. On the other hand, the properties in the present invention run at the user level, and can have GUIs call out to third party libraries and in general be far more expressive than a kernel injected spindle. Further, the properties of the present invention are expressed in terms of documents, as in "I attach property X to Document Y." The SPIN system, on the other hand, extends a system call such as "read", on all files. The example behaviors mentioned above are more easily mapped into a system such as the present invention in which properties are explicitly attached to individual documents.

Other work which allows operating system calls to be extended into user's code include, the article "Interposition Agents: Transparently Interposing User Code and System Interface," by Michael B. Jones in Proceedings of the 14$^{th}$ Symposium on Operating Systems, Principles, Asheville, N.C., December, 1993, pages 80–93. The article "SLIC: An Extensibility System for Commodity Operating Systems," by Douglas P. Ghormley, Steven H. Rodriguez, David Petrou, Thomas E. Anderson, which is to appear in the USENIX 1998 Annual Technical Conference, New Orleans, La., June 1998.

Further, the Windows NT (from Microsoft) has a function called "Filter Drivers" which, once installed, can see the accesses made to a file system. Installing filter drivers is a privileged operation, not available to normal users. As such, a user level mechanism, such as the document properties of the present invention and event dispatching architecture would be needed to allow users to express their desired behaviors.

There are also systems which, in a very specific domain, allow users to apply behaviors when documents are accessed. An example is the Tandem e-mail system, which has a "screen cobal" language and has hooks to find out when events occur. This system allows users to code filters to do custom operations when documents arrive and/or read. One of the differences between this system and the present invention, is that the Tandem system solves the problem in a specific domain and invokes only the user's behaviors when the documents are accessed via the mail application. In the present invention, the behaviors are invoked regardless of the application and regardless of the interface.

The paper, "Finding and Reminding: File Organization From the Desktop", D. Barreau and B. Nardi, SIGCHI Bulletin, 27 (3) July, 1995, reviews filing and retrieval practices and discusses the shortcomings of traditional file and retrieval mechanisms. The paper illustrates that most users do not employ elaborate or deep filing systems, but rather show a preference for simple structures and "location-based searches", exploiting groupings of files (either in folders, or on the computer desktop) to express patterns or relationships between documents and to aid in retrieval.

In response to the Barreau article, the article, "Find and Reminding Reconsidered", by S. Fertig, E. Freeman and D. Gelernter, SIGCHI Bulletin, 28(1) January, 1996, defends deep structure and search queries, observing that location-based retrieval is, "nothing more than a user-controlled logical search." There is, however, one clear feature of location-based searching which adds to a simple logical search—in a location-based system, the documents have been subject to some sort of pre-categorization. Additional structure is then introduced into the space, and this structure is exploited in search and retrieval.

The article "Information Visualization Using 3D Interactive Animation", by G. Robertson, S. Card and J. Mackinlay, Communications of the ACM 36 (4) April, 1993, discusses a location-based structure, an interesting feature is that it is exploited perceptually, rather tan cognitively. This moves the burden of retrieval effort from the cognitive to the perceptual system. While this approach may be effective, the information that the systems rely on is content-based, and extracting this information to find the structure can be computationally expensive.

The article "Using a Landscape Metaphor to Represent a Corpus of Documents," Proc. European Conference on Spatial Information Theory, Elba, September, 1993, by M. Chalmers, describes a landscape metaphor in which relative document positions are derived from content similarity metrics.

A system, discussed in "Lifestreams: Organizing your Electronic Life", AAAI Fall Symposium: AI Applications in Knowledge Navigation on Retrieval (Cambridge, Mass.), E. Freeman and S. Fertig, November, 1995, uses a timeline as the major organizational resource for managing document spaces. Lifestreams is inspired by the problems of a standard single-inheritance file hierarchy, and seeks to use contextual information to guide document retrieval. However, Lifestreams replaces one superordinate aspect of the document (its location in the hierarchy) with another (its location in the timeline).

The article "Semantic File Systems" by Gifford et al., Proc. Thirteenth ACM Symposium of Operating Systems Principals (Pacific Grove, Calif.) October, 1991, introduces the notion of "virtual directories" that are implemented as dynamic queries on databases of document characteristics. The goal of this work was to integrate an associating search/retrieval mechanism into a conventional (UNIX) file system. In addition, their query engine supports arbitrary "transducers" to generate data tables for different sorts of files. Semantic File System research is largely concerned with direct integration into a file system so that it could extend the richness of command line programming interfaces, and so it introduces no interface features at all other than the file name/query language syntax. In contrast, the present invention is concerned with a more general paradigm based on a distributed, multi-principal property-based system and with how interfaces can be revised and augmented to deal with it; the fact that the present invention can act as a file system is simply in order to support existing file system-based applications, rather than as an end in itself.

DLITE is the Stanford Digital Libraries Integrated Task Environment, which is a user interface for accessing digital library resources as described in "The Digital Library Integrated Task Environment" Technical Report SIDL-WP-1996-0049, Stanford Digital Libraries Project (Palo Alto, Calif.) 1996, by S. Cousins et al. DLITE explicitly reifies queries and search engines in order to provide users with direct access to dynamic collections. The goal of DLITE, however, is to provide a unified interface to a variety of search engines, rather than to create new models of searching and retrieval. So although queries in DLITE are independent of particular search engines, they are not integrated with collections as a uniform organizational mechanism.

Multivalent documents define documents as comprising multiple "layers" of distinct but intimately-related content. Small dynamically-loaded program objects, or "behaviors", activate the content and work in concert with each other and layers of content to support arbitrarily specialized document types. To quote from one of their papers, "A document management infrastructure built around a multivalent perspective can provide an extensible, networked system that supports incremental addition of content, incremental addition of interaction with the user and with other components, reuse of content across behaviors, reuse of behaviors across types of documents, and efficient use of network bandwidth."

Multivalent document behaviors (analogs to properties) extend and parse the content layers, each of which is expressed in some format. Behaviors are tasked with understanding the formats and adding functionality to the document based on this understanding. In many ways, the Multivalent document system is an attempt at creating an infrastructure that can deal with the document format problem by incrementally adding layers of "understanding" of various formats. In contrast, the present invention has an explicit goal of exploring and developing a set of properties that are independent of document format. While properties could be developed that could parse and understand content, it is expected that most will be concerned with underlying storage, replication, security, and ownership attributes of the documents. Included among the differences between the present invention and the Multivalent concepts are that, the Multivalent document system focuses on extensibility as a tool for content presentation and new content-based behaviors; the present invention focuses on extensible and incrementally-added properties as a user-visible notion to control document storage and management.

File systems known as the Andrew File System (AFS), Coda, and Ficus provide a uniform name space for accessing files that may be distributed and replicated across a number of servers. Some distributed file systems support clients that run on a variety of platforms. Some support disconnected file access through caching or replication. For example, Coda provides disconnected access through caching, while Ficus uses replication. Although the immediately described distributed file systems support document (or file) sharing, they have a problem in that a file's hierarchical pathname and its storage location and system behavior are deeply related. The place in the directory hierarchy where a document gets stored generally determines on which servers that file resides.

Distributed databases such as Oracle, SQL Server, Bayou, and Lotus Notes also support shared, uniform access to data and often provide replication. Like some distributed file systems, many of today's commercial databases provide support for disconnected operation and automatic conflict resolution. They also provide much better query facilities than file systems. However, distributed databases suffer the same problems as file systems in that the properties of the data, such as where it is replicated and how it is indexed and so on, are generally associated with the tables in which that data resides. Thus, these properties cannot be flexibly managed and updated. Also, the set of possible properties is not extensible.

A digital library system, known as the Documentum DocPage repository, creates a document space called a "DocBase." This repository stores a document as an object that encapsulates the document's content along with its attributes, including relationships, associated versions, renditions, formats, workflow characteristics, and security. These document objects can be infinitely combined and re-combined on demand to form dynamic configurations of document objects that can come from any source.

DocPage supports organization of documents via folder and cabinet metaphors, and allows searching over both document content and attributes. The system also provides checkin/checkout-style version control, full version histories of documents, and annotations (each with its own attributes and security rules). The system also supports workflow-style features including notification of updates. DocBase uses a replicated infrastructure for document storage (see: http://www.documentum.com).

Among the key differences between Documentum DocPage and the present invention are: First, in the present system properties are exposed as a fundamental concept in the infrastructure. Further, the present system provides for a radically extensible document property infrastructure capable of supporting an aftermarket in document attributes. Documentum seems to be rather closed in comparison; the possible attributes a document can acquire are defined a priori by the system for a particular application environment and cannot be easily extended. Additionally, Documentum does not have the vision of universal access to the degree of the present invention which supports near-universal access to document meta-data, if not document content. In comparison, the scope of Documentum narrows to document access within a closed setting (a corporate intranet).

SUMMARY OF THE INVENTION

The present invention contemplates a mechanism and method to maintain document identity during the translation of an operation from a hierarchical file system—which treats a document as a single repository of unified data—to a document—management system which adds additional information to a document thereby enhancing interactions with documents being managed—.

According to a more limited aspect of the present invention, the mechanism receives an instruction from an application of the hierarchical file system to rename or delete an original document. Upon receipt of this information, the mechanism maintains at least name information, location information and characteristic information of the original document. The name information, location information and characteristic information being retrieved to reconfigure the original document upon a predetermined event. The retrieved document receiving new content generated by the user.

According to a more limited aspect of the present invention, the characteristic information includes properties which are attached to the document.

With attention to still yet another aspect of the present invention, prior to being retrieved, the original document, after being deleted, is maintained invisible to the user.

With attention to yet another aspect of the present invention, the predetermined event is at least one of a rename or delete operation issued by the application, when the predetermined event occurs within a predetermined time period.

A principle advantage of the present invention is maintaining a document's identity across two different document management systems.

With attention to another advantage of the present invention, the properties which are attached to an original document are maintained when the content of that document is altered.

Still other advantages and benefits will become apparent to those skilled in the art upon a reading and understanding of the following detailed description.

DESCRIPTION OF THE DRAWINGS

The invention may take physical form in certain parts and arrangement of parts, a preferred embodiment of which will be described in detail in this specification and illustrated in the accompanying drawings which form a part hereof, and wherein:

FIGS. 5a–5c show a concept of the present invention.

DETAILED DESCRIPTION OF THE PREFERRED EMBODIMENTS

Figure 1:
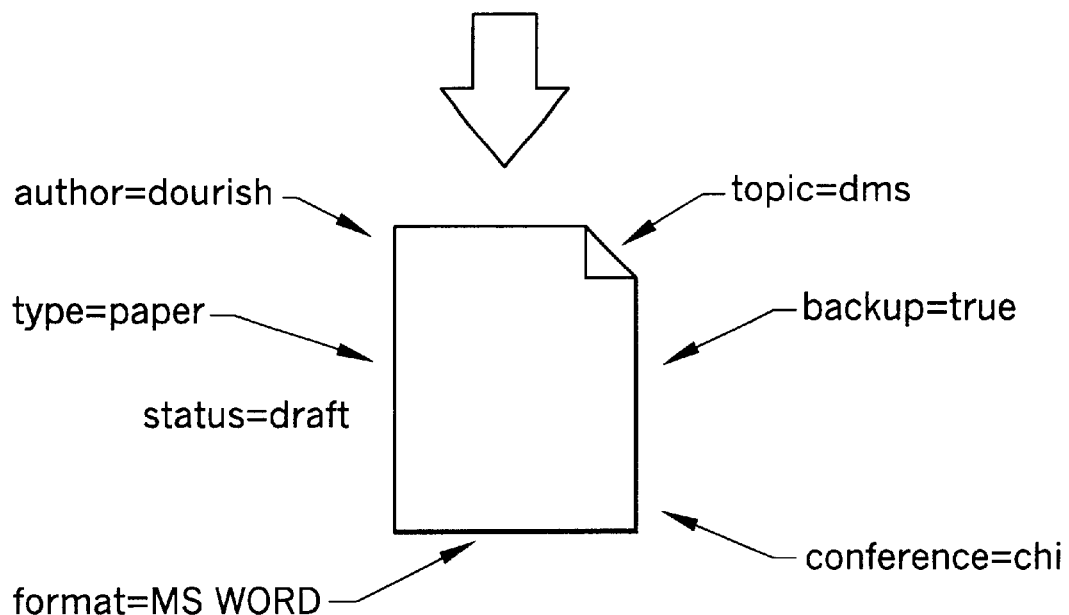
FIG. 1 shows a hierarchical storage mechanism compared to the concept of properties of the present invention.

Prior to discussing the present invention in greater detail, it is believed a glossary of terms used in the description would be beneficial. Therefore, the following definitions are set forth:

| | |
|---|---|
| Action: | The behavior part of a property. |
| Active Property: | A property in which code allows the use of computational power to either alter the document or effect another change within the document management system. |
| Arbitrary: | Ability to provide any property onto a document. |
| Base Document: | Corresponds to the essential bits of a document. There is only one Base Document per document. It is responsible for determining a document's content and may contain properties of the document, and it is part of every principal's view of the document. |
| Base Properties: | Inherent document properties that are associated with a Base Document. |
| Bit Provider: | A special property of the base document. It provides the content for the document by offering read and write operations. It can also offer additional operations such as fetching various versions of the document, or the encrypted version of the content. |
| Browser: | A user interface which allows a user to locate and organize documents. |
| Collection: | A type of document that contains other documents as its content. |
| Combined Document: | A document which includes members of a collection and content. |
| Content: | This is the core information contained within a document, such as the words in a letter, or the body of an e-mail message. |
| Content Document: | A document which has content. |

| | -continued |
|---|---|
| Distributed: | Capability of the system to control storage of documents in different systems (i.e., file systems, www, e-mail servers, etc.) in a manner invisible to a user. The system allows for documents located in multi-repositories to be provided to a principal without requiring the principal to have knowledge as to where any of the document's content is stored. |
| DMS: | Document Management System |
| Document: | This refers to a particular content and to any properties attached to the content. The content referred to may be a direct referral or an indirect referral. The smallest element of the DMS. There are four types of documents; Collection, Content Document, No-Content Document and Combined Document. |
| Document Handle: | Corresponds to a particular view on a document, either the universal view, or that of one principal. |
| DocumentID: | A unique identifier for each Base Document. A Reference Document inherits the DocumentID from its referent. Document identity is thus established via the connections between Reference Document References and Base Documents. Logically, a single document is a Base Document and any Reference Documents that refer to it. |
| Kernel: | Manages all operations on a document. A principal may have more than one kernel. |
| Multi-Principal: | Ability for muitiple principals to have their own set of properties on a Base Document wherein the properties of each principal may be different. |
| Notification: | Allows properties and external devices to find out about operations and events that occur elsewhere in DMS. |
| No Content Document: | A document which contains only properties. |
| Off-the-Shelf Applications: | Existing applications that use protocols and document storage mechanism provided by currently existing operating systems. |
| Principal: | A "User" of the document management system. Each person or thing that uses tne document management system is a principal. A group of people can also be a principal. Principals are central because each property on a document can be associated with a principal. This allows different principals to have different perspectives on the same document. |
| Property: | Some bit of information or behavior that can be attached to content. Adding properties to content does not change the content's identity. Properties are tags that can be placed on documents, each property has a name and a value (and optionally a set of methods that can be invoked). |
| Property Generator: | Special case application to extract properties from the content of a document. |
| Reference Document: | Corresponds to one principal's view of a document. It contains a reference to a Base Document (Reference Document A refers to Base Document B) and generally also contains additional properties. Properties added by a Reference Document belong only to that reference; for another principal to see these properties, it must explicitly request them. Thus, the view seen by a principal through his Reference Document is the document's content (through the Base Document), and a set of properties (both in the reference and on the Base Document). Even an owner of a Base Document can also have a Reference Document to that base, in which he places personal properties of the document that should not be considered an essential part of the document and placed in all other principal's view. |
| Space: | The set of documents (base or references) owned by a principal. |
| Static Property: | A name-value pair associated with the document. Unlike active properties, static properties have no behavior. Provides searchable meta-data information about a document. |

INTRODUCTION

As discussed in the background of the invention, the structure that file systems provide for managing files becomes the structure by which users organize and interact with documents. However, documents and files are not the same thing. The present invention has as an immediate goal to separate management of properties related to the document or concerning the document from the management of the document content. Therefore, user-specific document properties are managed close to the document consumer or user of the document rather than where the document is stored. Separation of the management of user properties from the document content itself provides the ability to move control of document management from a closed file system concept to a user-based methodology.

FIG. 1 illustrates a distinction between hierarchical storage systems whose documents are organized in accordance with their location described by a hierarchical structure and the present invention where documents are organized according to their properties (e.g. author=dourish, type=paper, status=draft, etc.). This means documents will retain properties even when moved from one location to another, and that property assignment can have a fine granularity.

Figure 2:
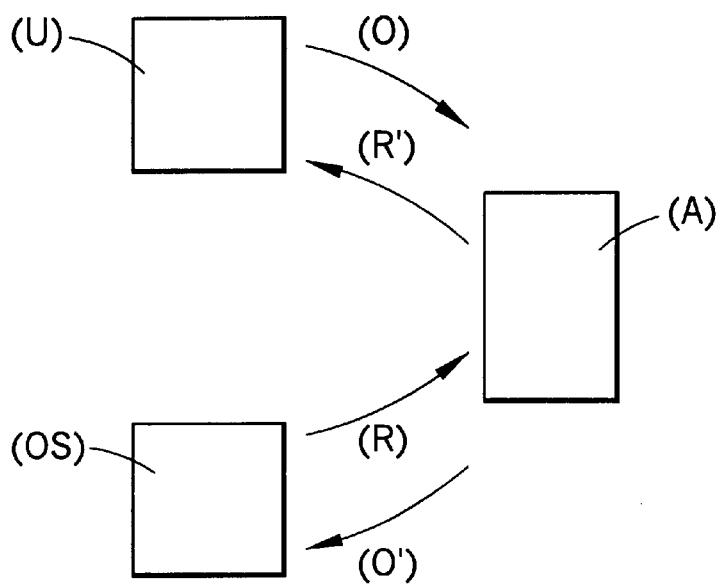
FIG. 2 is a block diagram of a document management system according to the present invention, interposed within a communication channel between a user and an operating system.

To integrate properties within the document management system of the present invention, the properties need to be presented within the content and/or property read/write path of a computer system, with the ability to both change the results of an operation as well as take other actions. The outline of the concept is described in FIG. 2, where once user (U) issues an operation request (O), prior to that operation being performed by operating system (OS), a call is made to document management system (DMS) A of the present invention, which allows DMS A to function so as to achieve the intended concepts of the present invention. This includes having DMS A interact with operating system (OS), through its own operation request (O'). Once operation request (O') is completed, the results are returned (R) to DMS A which in turn presents results (R') to user (U).

With these basic concepts having been presented, a more detailed discussion of the invention is set forth below.

Document Management System (DMS) Architecture

Figure 3:
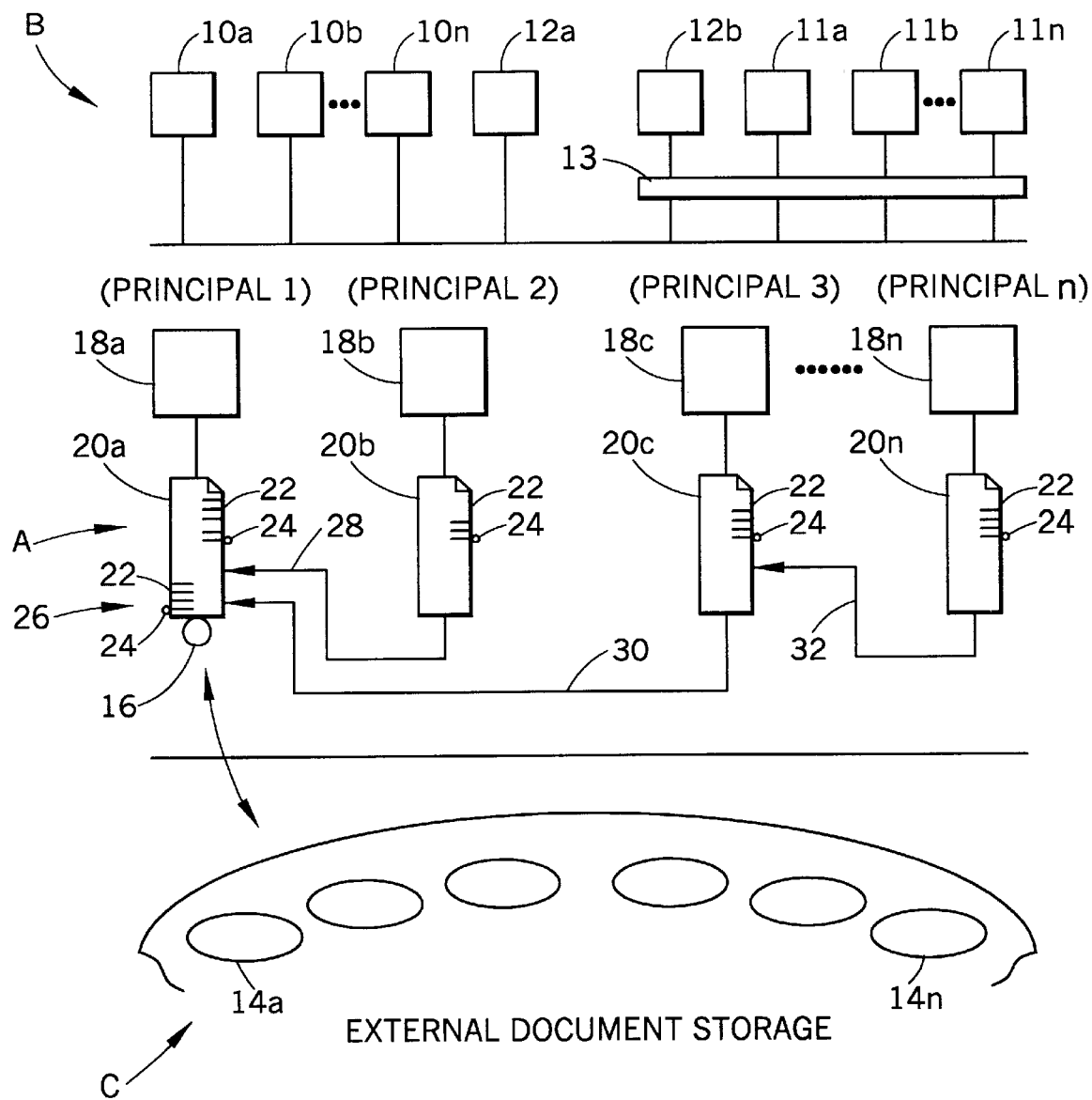
FIG. 3 is a representation of a document management system of the present invention implemented in a computer system.

FIG. 3 sets forth the architecture of a document management system (DMS) A of the present invention in greater detail.

Document management system (DMS) A is shown configured for operation with front-end components B, and back-end components C. Front-end components B include applications 10a–10n and 11a–11n, such as word processing applications, mail applications among others. Some of the applications are considered DMS aware 10a–10n which means these applications understand DMS protocols for storing, retrieving and otherwise interacting with DMS A. Other components are considered non-DMS aware 11a–11n. Browsers 12a (DMS aware) and 12b (non-DMS aware) are considered specialized forms of applications. In order for the non-DMS-aware applications 11a–11n and 12b to be able to communicate with DMS A, front-end translator 13 is provided.

Similarly, back-end components C can include a plurality of repositories 14a–14n, where the content of documents are stored. Such repositories can include the hard disc of a principal's computer, a file system server, a web page, a dynamic real time data transmission source, as well as other data repositories. To retrieve data content from repositories 14a–14n, bit providers, such as bit provider 16, are used. These bit providers are provided with the capability to translate appropriate storage protocols.

Principals 1–n each have their own kernel 18a–18n for managing documents, such as documents 20a–20n. Documents 20a–20n are considered to be documents the corresponding principal 1–n has brought into its document management space. Particularly, they are documents that a principal considers to be of value and therefore has in some manner marked as a document of the principal. The document, for example, may be a document which the principal created, it may be an e-mail sent or received by the principal, a web page found by the principal, a real-time data input such as an electronic camera forwarding a continuous stream of images, or any other form of electronic data (including video, audio, text, etc.) brought into the DMS document space. Each of the documents 20a–20n have static properties 22 and/or active properties 24 placed thereon.

Document 20a, is considered to be a base document and is referenced by reference documents 20b–20c. As will be discussed in greater detail below, in addition to base document 20a having static properties 22 and/or active properties 24, base document 20a will also carry base properties 26 which can be static properties 22 and/or active properties 24 (Static properties are shown with a—and active properties are shown with a —o).

Reference documents 20b–20c are configured to interact with base document 20a. Both base documents and reference documents can also hold static properties 22 and/or active properties 24. When principals 2,3 access base document 20a for the first time, corresponding reference documents 20b–20c are created under kernels 18b–18c, respectively. Reference documents 20b–20c store links 28 and 30 to unambiguously identify their base document 20a. In particular, in the present invention each base document is stored with a document ID which is a unique identifier for that document. When reference documents 20b–20c are created, they generate links to the specific document ID of their base document. Alternatively, if principal n references reference document 20c, reference document 20n is created with a link 32 to reference document 20c of Principal 3. By this link principal n will be able to view (i.e. its document handle) the public properties principal 3 has attached to its reference document 20c as well as the base properties and public reference properties of base document 20a. This illustrates the concept of chaining.

The above described architecture allows for sharing and transmission of documents between principals and provides the flexibility needed for organizing documents. With continuing attention to FIG. 3, it is to be noted at this point that while links 28–30 are shown from one document to another, communication within DMS A is normally achieved by communication between kernels 18a–18n. Therefore, when DMS A communicates with either front-end components B, back-end components C, or communication occurs between principals within DMS A, this communication occurs through kernels 18a–18n. It is however, appreciated the invention will work with other communication configurations as well.

Using the described architecture, DMS A of the present invention does not require the principal to operate within a strict hierarchy such as in file or folder-type environments. Rather, properties 22, 24 which are attached to documents allows a principal to search and organize documents in accordance with how the principal finds it most useful.

For instance, if principal 1 (owner of kernel 18a) creates a base document with content, and stores it within DMS A, and principal 2 (owner of kernel 18b) wishes to use that document and organize it in accordance with its own needs, principal 2 can place properties on Reference Document 20b. By placement of these properties, principal 2 can retrieve the base document in a manner different than that envisioned by principal 1.

Further, by interacting with browser 12, a principal may run a query requesting all documents having a selected property. Specifically, a user may run query language requests over existing properties Therefore, a point of the present invention is that DMS A manages a document space where properties are attached by different principals such that actions occur which are appropriate for a particular principal, and are not necessarily equivalent to the organizational structure of the original author of a document or even to other principals.

Another noted aspect of the present invention is that since the use of properties separates a document's inherent identity from its properties, from a principal's perspective, instead of requiring a document to reside on a single machine, documents in essence can reside on multiple machines (base document 20a can reside on all or any one of kernels 18a–18n). Further, since properties associated with a document follow the document created by a principal (for example, properties on document 20b of kernel 18b, may reference base document 20a), properties of document 20b will run on kernel 18b, even though the properties of document 20b are logically associated with base document 20a. Therefore, if a property associated with document 20b (which references base document 20a) incurs any costs due to its operation, those costs are borne by kernel 18b (i.e. principal 2), since properties are maintained with the principal who put the properties onto a document.

Support for Native Applications

A DMS document interface provides access to documents as Java objects. Applications can make use of this interface by importing the relevant package in their Java code, and coding to the API provided for accessing documents, collections and properties. This is the standard means to build new DMS-aware applications and to experiment with new interaction models. DMS Browser 12 (of FIG. 3) can be regarded as a DMS application and is built at this level. The DMS document interface provides Document and Property classes, with specialized subclasses supporting all the functionality described here (such as collections, access to WWW documents, etc.). Applications can provide a direct view of DMS documents, perhaps with a content-specific visualization, or can provide a wholly different interface, using DMS as a property-based document service back-end.

Support for Off-the-Shelf Applications

Another level of access is through translators (such as translator 13 of FIG. 3). In an existing embodiment, a server implementing the NFS protocol is used as the translator. This is a native NFS server implementation in pure Java. The translator (or DMS NFS server) provides access to the DMS document space to any NFS client; the server is used to allow existing off-the-shelf applications such as Microsoft Word to make use of DMS documents; on PC's, DMS simply looks like another disk to these applications, while on UNIX machines, DMS A looks like part of the standard network filesystem.

Critically, though, what is achieved through this translator is that DMS A is directly in the content and property read/write path for existing or off-the-shelf applications. The alternative approach would be to attempt to post-process files written to a traditional filesystem by applications, such as Word, that could not be changed to accommodate DMS A. By instead providing a filesystem interface directly to these applications, it makes it possible to execute relevant properties on the content and property read/write path. Furthermore, it is ensured that relevant properties (such as ones which record when the document was last used or modified) are kept up-to-date. Even though the application is written to use filesystem information, the DMS database remains up to date, because DMS A is the filesystem.

As part of its interface to the DMS database layer, NFS provides access to the query mechanism. Appropriately formatted directory names are interpreted as queries, which appear to "contain" the documents returned by the query. Although DMS provides this NFS service, DMS is not a storage layer. Documents actually live in other repositories. However, using the NFS layer provides uniform access to a variety of other repositories (so that documents available over the Web appear in the same space as documents in a networked file system). The combination of this uniformity along with the ability to update document properties by being in the read and write path makes the NFS service a valuable component for the desired level of integration with familiar applications. It is to be appreciated that while a Java implementation, as well as a server implementing NFS protocol are discussed, these are only potential mechanisms of implementing the present invention and other options are also available.

Maintaining Document Identity During Conversion of Off-the-Shelf Application Instructions to DMS Protocol As has been previously discussed, translators (e.g. translator 13 of FIG. 3) are provided as part of DMS A, to allow interaction with off-the-shelf applications. Translators allow not only existing off-the-shelf applications to interact with DMS A, but also will allow yet to be built applications to interface when a corresponding translation mechanism is added. A particular aspect of the translation procedure is the need to maintain a consistent document identity and persistent properties within DMS A, when DMS A is accessed by off-the-shelf applications through the translator interface.

Existing applications, including but not limited to word processing, email, www based applications, have an awareness regarding directories which employ standard hierarchical file systems. When a request is made by one of the existing applications, it is expected that operations will be based on a simple, straightforward model of file identity, where the file is identified by its name, coded in a form such as :\dir1\dir2\filename. Applications that use this type of file system format frequently exploit this method of identification, wherein the file name also identifies its location, when saving new versions of a file. For instance, to protect against write failures, it is common to save a new version to a new file with a different name, and after that save has been deemed successful, erase the original file and rename the new file to the same name as the original.

Figure 4:
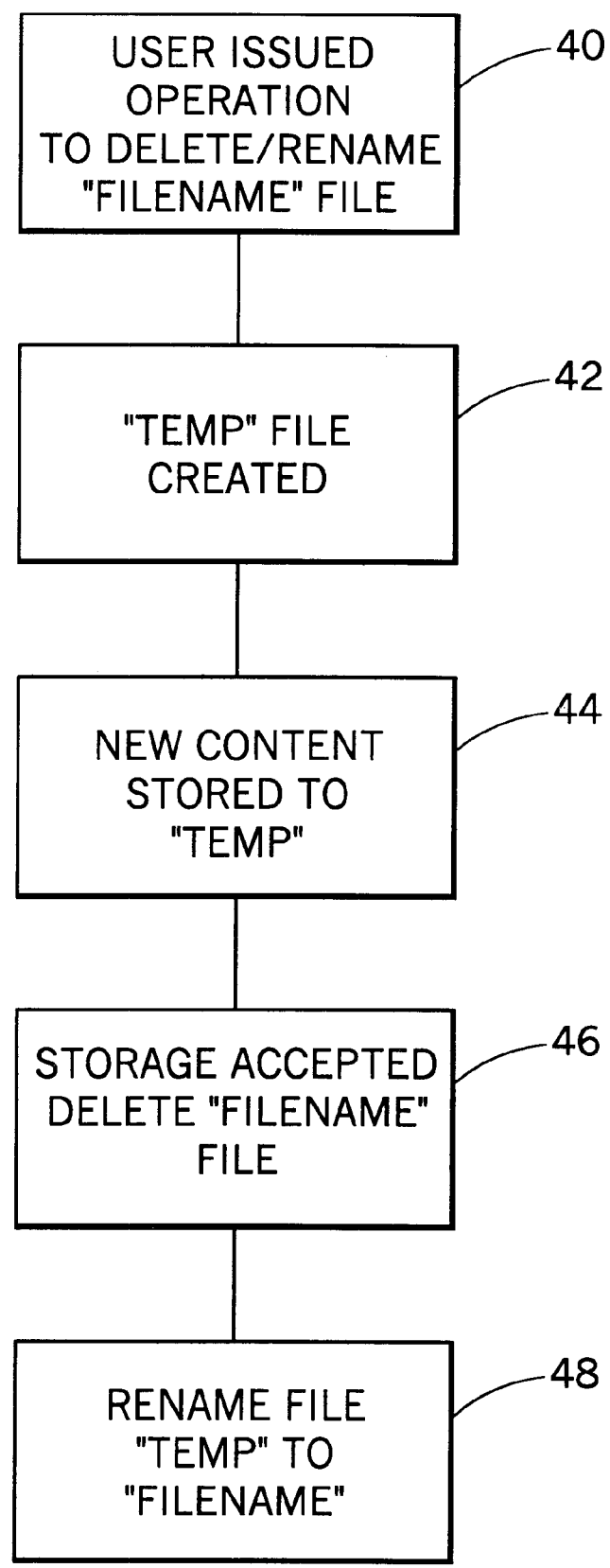
FIG. 4 is a modified flow chart of an existing storage procedure.

The above operation is depicted by FIG. 4. In an existing file system a file (i.e. \dir1\dir2\filename) is stored in a data storage repository. A user edits the content of this document with an intention to store the edited content of the document in place of the existing content (40). Upon the issuance of a write instruction, the computer system creates a new file "temp" (42). The new version of the content is then stored into this temporary file under the newly created name (i.e. "temp") (44). Once the system determines that the write process has been successful and the new version is stored in the "temp" file, the original "filename" file is deleted (46). The "temp" file is then renamed as "filename" (48). Following this operation, any subsequent operation request for the original file (i.e., by use of the name \dir1\dir2\filename) will receive the newly saved content, as intended by the user.

While variations of this procedure exist depending upon the particular application, the concept of ensuring that the new file name of the new file has the same name (including the directory location) as the original file is commonly provided for in off-the-shelf applications. The reason the procedures of FIG. 4, and other similar procedures, are successful relies on the fact that these systems assume a file having the name "filename" within a specific directory path (dir1,dir2) is the same file since it is in the same location. Particularly, there is no consistent mechanism which allows a user to differentiate between the original "filename" file and the "temp" file once "temp" has been given its new name (i.e. "filename"). Thus, it is not possible to distinguish between writing over the existing "filename" file and replacing it with the "temp" file.

DMS A offers capabilities for interacting with document spaces not possible with existing hierarchical based file systems. In order to work with existing applications, DMS A provides interfaces to off-the-shelf file systems. In this case, the existing applications will not be able to use the new features, but will still be able to read and write content. The new information recorded by DMS A changes the system's notion of the file's "identity." The file name and location no longer uniquely identify a particular file. This is a basic distinction between a "document" in DMS A and a file in an off-the-shelf file system.

Separating the inherent identity of the document based on its location as done in DMS A, creates a potential problem in that the state of the document depends not only on its name, location, and file contents, but also on the properties which are attached to the document. Thus, an attempt to manage a DMS-type document by existing applications which do not understand properties is unreliable.

DMS A documents which are moved around via off-the-shelf file system interfaces should correspondingly move all of the additional information, such as properties, so as to maintain the properties in association with the content. However, under existing process there is no procedure to ensure this outcome.

An example of this problem is illustrated in connection with FIGS. 5a–5c. As depicted in FIG. 5a, a document 50 has attached thereto active and static properties 52 and 54, and its content 56 is stored separate from the properties. A user edits document (i.e. "filename") 50 through one of various existing file system interfaces (i.e. 11a–11n of FIG. 3) via a translator (i.e. translator 13 of FIG. 3). Once editing is complete, as shown in FIG. 5b, the application issues a write instruction 60 to write the new content 56' to another file (i.e. "temp") 62. Once it is verified the content is stored in the "temp" file, the application acts to delete the original document (i.e. "filename") 64 and renames "temp" as "filename" 66. FIG. 5c illustrates that following this procedure, new content 56' has lost its connection to properties 52, 54 which are attached to original document 50. This is true even though all the user did was save the document. In addition, if the original file actually lived somewhere other than on the user's machine, that version wasn't updated, since the new content was written to a different file altogether.

The source of the problem is that the application that saved the new version of the document was not aware that any other information was attached to it or that it was stored someplace else entirely, and as a result, believed that it could completely reconstruct the document by creating a document of the same name in its place and saving only its content.

As a further explanation, in DMS A each document has a single unique identifier, i.e. a document id. Therefore, for the following example it is assumed that "filename" has a DMS document id of "101." Then under the scenario of writing a new document, an existing file system procedure creates "temp" which in DMS A is document "102." The new content is then saved to "temp." The system deletes document "101" and then renames document "temp" to "filename." However, this is still document "102" in DMS A. It has simply been provided with a different name. Again, the problem which exists is that DMS A identifies files by their document id and names are simply another property which may be attached to a document. For example, one document can have a plurality of names by different users or one users may have a plurality of names for a single document. Thus, execution of write procedures by existing non-DMS aware applications lowers the reliability of interactions between DMS A.

A specific detrimental outcome of the above example is that a user may have attached properties to the original document "filename", (for example, they may have attached a property such as "interesting" which would indicate to that particular user that it is part of an "interesting" collection of documents). When the property "interesting" was attached, it was attached to document "101." However, when the new version of the document is saved the process ends up deleting document "101" deleting the "interesting" property. Therefore, the new document "102" will have the content which has been revised but will not have the "interesting" or other properties attached to document "101." This occurs, since under existing hierarchical file systems there is the assumption that since it is the same file name, it is in the same location. However, as previously noted, the inherent relationship between file name and location does not exist in DMS A.

In consideration of the above problems, a mechanism has been developed for maintaining the additional information, in the form of properties, attached to documents in DMS A when access is made through existing off-the-shelf file system interfaces that assume name equivalents for file identity. Using this mechanism properties attached to documents will be maintained when DMS A interacts with off-the-shelf file system interfaces.

The foregoing problem is especially prevalent during delete and rename operations. A solution which is presented is directed to the situation where a document is to be deleted. As part of the solution, the document is not actually deleted. Rather, it is made "invisible" to the user. For example, if all the documents are listed, the deleted document will not appear. However, it is still maintained within the system and includes the capability of remembering its name. Then if a user attempts to create a document with that name or rename a document to that same name, the present invention interprets this as an attempt to recreate that original document.

The two main instances when the present situation arises, are when an existing document is renamed to the same name, i.e. some editing of the content has occurred, and/or where a new document is created with the previously existing name.

For explanation purposes, the following will discuss a situation where a document is to be renamed, as this is the more complicated of the situations and the instance of creating a new document includes the same general concepts.

For purposes of the following discussion, it will be assumed that the concept of "rename" will be a procedure where an existing application wishes to alter content of the document. To accomplish this, an existing document (document "101") is resurrected with all of its existing properties attached, and the contents of a "temp" document (document "102") are copied into document "101". Thereafter, document "102" is deleted.

Figure 6:
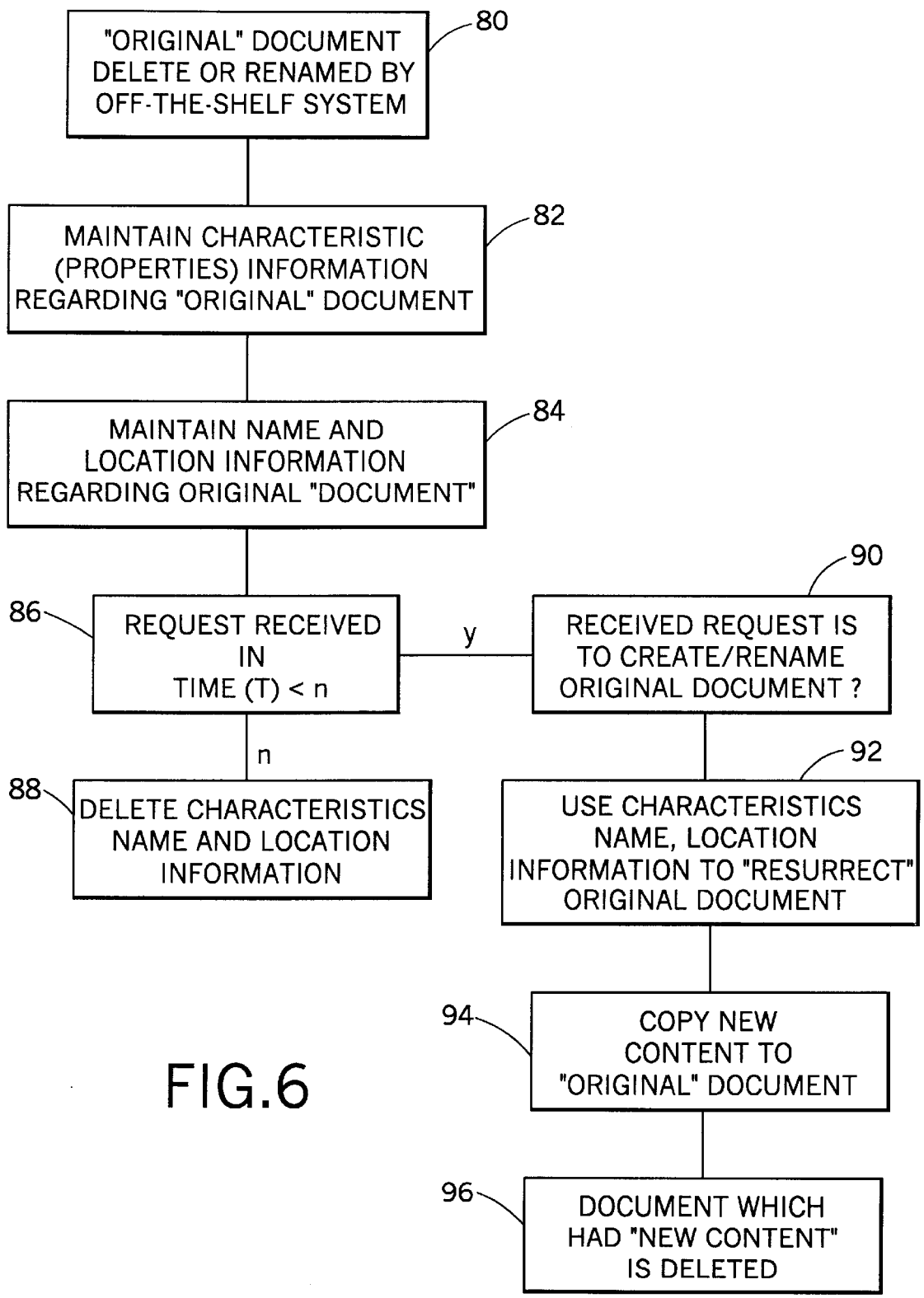
FIG. 6 is a flow chart of the present invention.

Attention is directed to FIG. 6. When a document (document "101") is deleted or renamed by an off-the-shelf system interface 80, the present invention maintains a copy of the properties that were attached to the document (document "101") 82. The system further maintains the name and location of the original document 84. The information in steps 82 and 84 is maintained for a predetermined amount of time 86. If no further instructions are received during the predetermined amount of time, information maintained in steps 82 and 84 is deleted 88 and the newly designated document is maintained. If however, an application attempts to create a document with the same name, or tries to rename a document to that same name, additional steps are undertaken 90. It is to be noted that programs do not have a long delay period to replace the deleted document with a new document. Therefore, a preferred embodiment would have a delay time in step 86 of approximately 10 seconds, however, other times may be more appropriate depending on the use of the system and the programs involved.

Next, upon the sensing the application interaction in step 90, the present invention "resurrects" the original document (document "101") still in its original location 92. Then, the new content (from document "102") is copied into the original document (document "101") 94, and the new document ("102") is deleted 96.

By the procedures shown in FIG. 6, the present invention maintains the original properties and identity of the original document (document "101") and the new content (i.e., the content from document "102") is written to the original document (document "101") so that other users referring to that document will find it in the same place and with the same name.

Thus, when accessed through existing off-the-shelf interfaces, the present invention offers the same name—equivalent semantics as the existing document systems. Any content that shows up with the same name as a recently deleted file acquires all of the additional properties that the original document included. It is understood that there are other processes by which the results of the present invention may be obtained. It would be possible to copy the properties or copy the file contents in order to maintain this integrity over existing off-the-shelf file system interfaces. However, the present invention addresses and solves the problem that when an existing application does a deletion followed by a re-creation procedure, within a certain time period, the document will have had its properties preserved. Additionally, the document id is also preserved. Therefore, accesses by document id will continue to function even after the operation.

Thus, the present invention overcomes the problems associated with interfacing between existing off-the-shelf file systems (which operate under the assumption of inherent name location equivalents) when interfacing to DMS A where the location of the document content is separated from the properties of the document, and where those properties are attached by a user to the document.

One example where the value of this present invention is seen, is in connection with collections. Particularly, assuming a DMS A user has generated a collection of documents, and the manner in which the user remembers the documents of the collection is by writing down the document id (i.e. the user has document 101, document 102, document 103 . . . document 10*n*). Then if the user makes a new document (i.e. document 10*x*) and copies document 101 over to document 10*x*, without this mechanism document 10*x* would simply disappear from the user's collection as the properties would not be transferred. However, using the described mechanism, the "new" document will remain in the collection.

So the present invention is concerned with inheriting properties on newly created documents. The present invention looks to existing file systems to detect when the existing file system is attempting to take an action which will attempt to maintain document identity. When this is sensed, DMS A will apply the mechanism described above to maintain identity within DMS A. The steps for actually storing the content (i.e. from document 102 to document 101) are well-known in the art. Particularly, one manner of obtaining this outcome is by adjusting a pointer to the area of the contents.

The invention has been described with reference to the preferred embodiment. Obviously, modifications and alterations will occur to others upon reading and understanding this specification. It is intended to include all such modifications and alterations in so far as they come within the scope of the appended claims or the equivalents thereof.

Having thus described the present invention, we now claim:

1. A mechanism for maintaining a document identity during a translation instruction from a hierarchical file system based application to a document management system which separates a content of a document from properties of the document, wherein the properties of the document are attached to the document by a user, the mechanism comprising:

a means for receiving, from the application, a rename or delete operation in connection with an original document;

a means for maintaining name information, location information and properties of the original document;

a means for retrieving the name information, location information, and properties of the original document, upon a predetermined event; and, a means of copying new content to the original document.

2. The mechanism according to claim 1 wherein the predetermined event is a rename or delete operation issued by the application within a predetermined time period.

3. The mechanism according to claim 1 wherein when the original document is deleted, information as to the maintained data is not visible to a user.

4. The mechanism according to claim 1 wherein the original document within a collection of documents is maintained even when the content of the original document is changed.

5. The mechanism according to claim 1 wherein the properties which are attached to the document by the individual user, are appropriate for the individual user, without needing to be appropriate for the overall document management system.

6. A system which maintains a document identity when a document is translated, the system comprising:

a hierarchical file system;

a document management system which separates a content of a document from the document and where properties are attached to the document by an individual user;

a means for sensing issuance of an instruction from a hierarchical application to delete or rename an original document;

a means for maintaining properties of an original document which is to be deleted or renamed;

a means for maintaining a name and location of the original document which is being deleted or renamed;

a means for determining receipt of (i) an instruction to create a new document with the name of the original document or (ii) an instruction to attempt to rename the original document;

a means for determining if either one of the instructions are received within a predetermined amount of time following the original delete or rename instruction;

a means for resurrecting the original document in its original location, including having its original name and the attached properties; and, a means for adding new content to the original document, wherein the original document maintains properties attached by the document management system.

7. The system according to claim 6 wherein the properties which are attached to the document by the individual user appropriate for the individual user, without needing to be appropriate for the overall document management system.

8. A method of maintaining a document identity during a translating operation from a hierarchical file system application which treats a document as a single repository of unified data, to a document management system which adds additional information to a document thereby enhancing interactions with documents being managed, the method comprising:

receiving an instruction from an application of a hierarchical file system to rename or delete an original document;

maintaining at least name information, location information and properties of the original document upon a rename or delete instruction;

retrieving the name information, location information, and properties of the original document, upon a predetermined event; and, copying new content to the original document.

9. The method according to claim 8 wherein the properties which are attached to the document by the individual user are appropriate for the individual user, without needing to be appropriate for the overall document management system.

* * * * *